United States Patent
Hwu et al.

(10) Patent No.: US 8,893,627 B2
(45) Date of Patent: Nov. 25, 2014

(54) LINEAR ACTUATOR AND LINEAR ACTUATING MODULE HAVING SAME

(71) Applicant: Academia Sinica, Taipei (TW)

(72) Inventors: En-Te Hwu, Taipei (TW); Ing-Shouh Hwang, Taipei (TW); Wei-Min Wang, Taipei (TW)

(73) Assignee: Academia Sinica, Taipei (TW)

( * ) Notice: Subject to any disclaimer, the term of this patent is extended or adjusted under 35 U.S.C. 154(b) by 0 days.

(21) Appl. No.: 13/855,480

(22) Filed: Apr. 2, 2013

(65) Prior Publication Data
US 2013/0291669 A1    Nov. 7, 2013

(30) Foreign Application Priority Data
May 2, 2012    (TW) .............................. 101115618 A

(51) Int. Cl.
*A47B 85/00*    (2006.01)
*F16H 25/20*    (2006.01)

(52) U.S. Cl.
CPC ............ *F16H 25/20* (2013.01); *F16H 25/2015* (2013.01); *F16H 2025/204* (2013.01); *F16H 2025/2075* (2013.01)
USPC .......................... 108/20; 248/425; 74/424.71

(58) Field of Classification Search
USPC .......... 108/20, 21, 22, 147; 248/425; 310/20, 310/80; 74/424.71, 89.23, 59.31, 490.09, 74/9.31, 490.088
See application file for complete search history.

(56) References Cited

U.S. PATENT DOCUMENTS

| | | | | |
|---|---|---|---|---|
| 3,638,933 | A * | 2/1972 | Burnette et al. | 108/20 |
| 5,123,174 | A * | 6/1992 | Noguchi | 33/568 |
| 5,163,651 | A * | 11/1992 | Matsumoto | 248/425 |
| 5,251,501 | A * | 10/1993 | Katahira | 108/20 |
| 5,309,847 | A * | 5/1994 | Matsumoto | 108/143 |
| 5,311,791 | A * | 5/1994 | Yanagisawa | 74/490.09 |
| 5,794,541 | A * | 8/1998 | Hirose | 108/20 |
| 5,939,852 | A * | 8/1999 | Akutsu et al. | 318/640 |
| 6,073,505 | A | 6/2000 | Yuda | |
| 6,157,159 | A * | 12/2000 | Korenaga et al. | 108/20 |
| 6,246,202 | B1 * | 6/2001 | Lee | 248/638 |
| 6,450,295 | B1 * | 9/2002 | Tsukada et al. | 74/424.71 |
| 6,550,401 | B2 * | 4/2003 | Chiba | 108/20 |
| 6,791,220 | B1 | 9/2004 | Suzuki et al. | |
| 6,811,131 | B2 * | 11/2004 | Kuo | 248/346.03 |
| 7,566,092 | B2 * | 7/2009 | Paton et al. | 296/146.8 |
| 8,020,462 | B2 | 9/2011 | Kobayashi et al. | |
| 8,061,227 | B2 * | 11/2011 | Sakai | 74/89.34 |
| 8,109,163 | B2 * | 2/2012 | Hudson et al. | 74/89.25 |
| 2002/0144561 | A1 * | 10/2002 | Nagai et al. | 74/89.23 |
| 2003/0145669 | A1 * | 8/2003 | Favre | 74/89.37 |
| 2006/0126869 | A1 | 6/2006 | Chiang | |
| 2008/0101737 | A1 * | 5/2008 | Akiyama | 108/20 |
| 2010/0192713 | A1 * | 8/2010 | Duits et al. | 74/89.23 |
| 2014/0157919 | A1 * | 6/2014 | Kondo, Nobuki | 74/89.23 |

* cited by examiner

*Primary Examiner* — Jose V Chen
(74) *Attorney, Agent, or Firm* — Brinks Gilson & Lione

(57) ABSTRACT

A linear actuator includes a housing, a rotary unit disposed in the housing, and a screw member driven by the rotary unit. The rotary unit is translatable relative to the housing when the screw member is driven by the rotary unit.

19 Claims, 6 Drawing Sheets

LINEAR ACTUATOR AND LINEAR ACTUATING MODULE HAVING SAME

CROSS-REFERENCE TO RELATED APPLICATION

This application claims priority under 35 U.S.C. §119 to Taiwan Patent Application No. 101115618, titled "Linear Actuating Module", filed on May 2, 2012, the entire content of which is hereby incorporated by reference in its entirety.

FIELD

This application relates to actuating devices, and more particularly to linear actuators and actuating modules having same.

BACKGROUND

The background description provided herein is for the purpose of generally presenting the context of the disclosure and may not constitute prior art.

A linear actuator generally includes a motor that provides torque to rotate a lead screw, which in turn translates the rotary motion into a linear motion. The linear actuator typically includes a complicated coupling device including multiple components to connect the motor shaft to the lead screw. The multiple components need to have small manufacturing and assembly tolerance to ensure proper alignment between the motor shaft and the lead screw, thereby increasing manufacturing costs. The manufacturing costs are higher when the linear actuators are designed for nano-scale positioning.

Further, the coupling device typically extends a significant length to provide room for the linear movement of the lead screw. As such, the complicated coupling system undesirably increases the space required for the linear actuator and further reduces the stiffness of the linear actuator. Clearances among the multiple components of the coupling device also result in reduced stiffness of the linear actuators.

SUMMARY

The present disclosure provides a linear actuator and a linear actuating module incorporating same, which have improved stiffness and precision in a nanometer-scale positioning and can be manufactured with lower costs.

In one form, a linear actuator according to the present disclosure includes a housing, a rotary unit disposed in the housing, and a screw member driven by the rotary unit. The rotary unit is translatable relative to the housing when the screw member is driven by the rotary unit. The rotary unit moves with the screw member along a longitudinal direction of the screw member when the rotary unit drives the screw member.

BRIEF DESCRIPTION OF THE DRAWINGS

The accompanying drawings, incorporated in and forming a part of the specification, illustrate several aspects of the present invention and, together with the description, serve to explain the principles of the invention. The components in the figures are not necessarily to scale. In the drawings.

DETAILED DESCRIPTION

The following description is merely exemplary in nature and is in no way intended to limit the present invention, its application, or uses. It should also be understood that steps within a method may be executed in different order without altering the principles of the invention.

Figure 1:
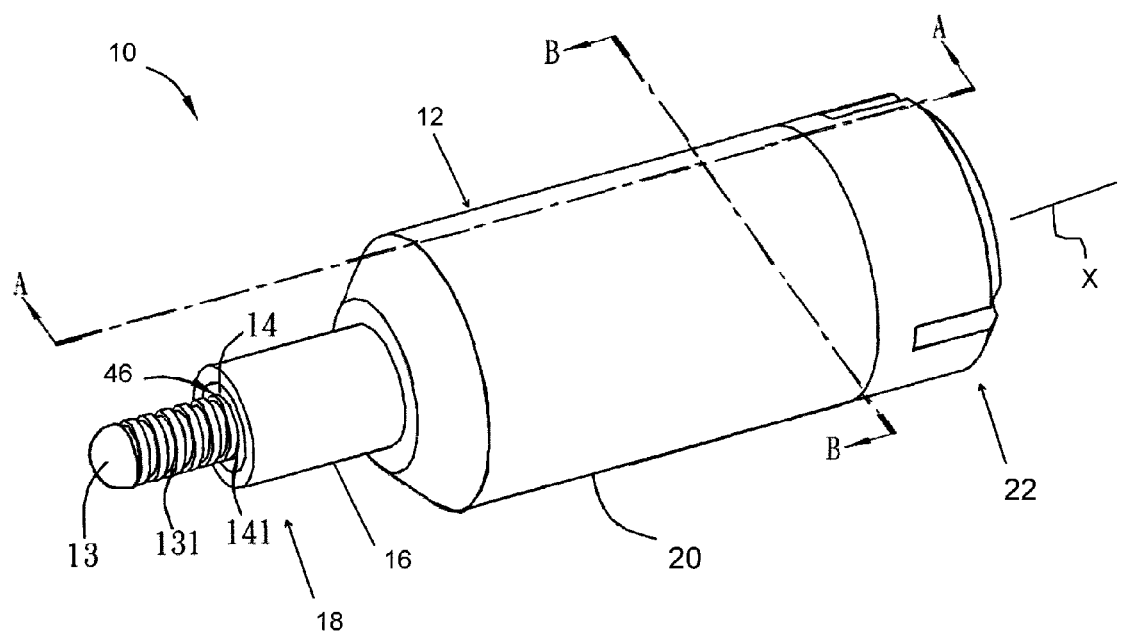
FIG. 1 is a perspective view of a linear actuator of a first embodiment of the present disclosure.

Referring to FIG. 1, a linear actuator 10 generally includes a housing 12, a screw member 13 and a guiding member 14. The housing 12 includes a narrowed housing portion 16 adjacent to a front end 18 and an enlarged housing portion 20 adjacent to a rear end 22. The screw member 13 may be a lead screw and have external threads 131 that engage internal threads 141 of the guiding member 14. The screw member 13 extends forwardly from the front end 18 of the housing 12 and is coaxially aligned with the narrowed housing portion 16 and the enlarged housing portion 20. While the housing 12 is shown to be cylindrical, the housing 12 can have any other shapes, such as elliptical, polyhedron, or irregular shape without departing from the scope of the present disclosure.

Figure 2:
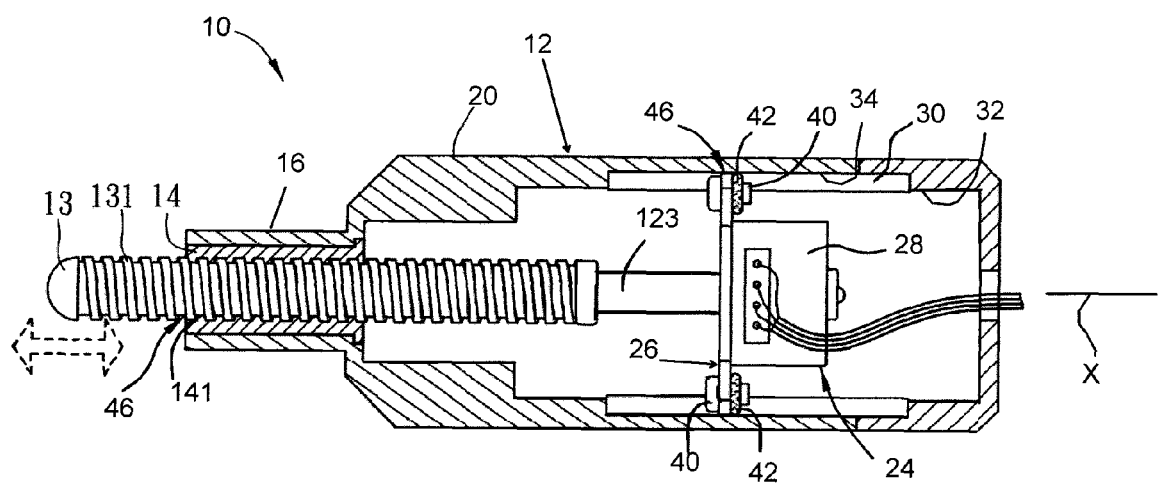
FIG. 2 is a cross-sectional view of a linear actuator of the present disclosure, taken along Line A-A of FIG. 1.

Referring to FIG. 2, the linear actuator 10 further includes a rotary unit 24 disposed in the enlarged housing portion 20 of the housing 12 for driving the screw member 13. The rotary unit 24 includes a sliding bracket 26 and a motor 28 attached to the sliding bracket 26. The enlarged housing portion 20 defines two guiding grooves 30 diametrically formed on the inner surface 32 of the enlarged housing portion 20. The guiding grooves 30 have groove surfaces 34 recessed from the inner surface 32. The guiding grooves 30 extend along a longitudinal axis X of the housing 12 and are parallel to the longitudinal axis of the screw member 13. The sliding bracket 26 includes fasteners 40 and damping materials 42 corresponding to the guiding grooves 30. The damping materials 42 are in direct contact with the groove surfaces 34 of the guiding grooves 30.

Figure 3:
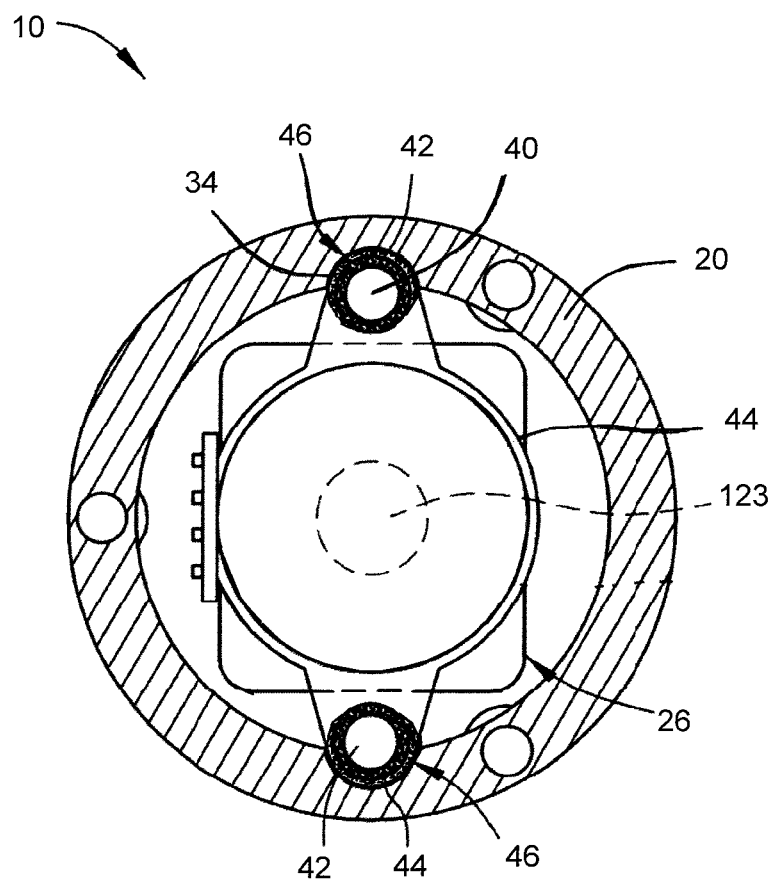
FIG. 3 is a cross-sectional view of a linear actuator of the present disclosure, taken along Line B-B of FIG. 1.

As clearly shown in FIG. 3, the sliding bracket 26 includes a main body 44 and two opposing lugs 46 extending radially and diametrically from the main body 44 and into the guiding grooves 30. The fasteners 40 are inserted into openings in the lugs 46 to fasten the damping materials 42 to the lugs 46. The damping materials 42 protrude outwardly from an outer periphery of the lugs 46 to fill the gap between the lugs 46 and the groove surfaces 34, while allowing the sliding bracket 26 to slide in the guiding grooves 30. The fasteners 40 may be screws, bolts or any conventional fasteners known in the art. The damping materials 42 may be O-rings and/or made of rubber. By using the damping materials 42 to fill the gap between the sliding bracket 26 and the groove surfaces 34 of the guiding grooves 30, the linear actuator 10 can have improved stiffness and reduced vibration.

While two guiding grooves 30 are shown, it is understood that any number of the guiding grooves 30, including one, can be formed in the housing 12 to achieve the desired function without departing from the scope of the present disclosure.

The screw member 13 is directly secured to a motor shaft 123 of the motor 28. The motor 28 has a motor shaft 123 directly secured to the screw member 13 to drive the screw member 13. The motor 28 may be a stepping motor, a servo motor or any kind of linear motor, as long as it can provide rotary motion to the screw member 13.

The screw member 13 extends to a mid-portion of the housing 12. A substantial length of the screw member 13 is disposed inside the housing 12. One side of the screw member 13 is secured to the motor shaft 123. The portion of the screw member 13 adjacent to the other end is stably supported by the guiding member 14. The guiding member 14 is disposed in an opening 46 of the narrowed portion 16 of the housing 12 and extends along an entire length of the narrowed portion 16. Therefore, the screw member 13 can be more stably supported in the housing 12.

In operation, when the motor 28 drives the screw member 13, the threaded connection between the screw member 13 and the guiding member 14 causes the screw member 13 to move along a direction parallel to the longitudinal axis X of the housing 12 because the guide member 14 is fixed to the housing 12. The motor 28 and the screw member 13 are connected. Therefore, the rotary unit 26 moves with the screw member 13 inside the housing 12 due to the sliding contact between the groove surfaces 34 and the damping materials 42.

In addition, the sliding bracket 26 and the guiding grooves 30 not only allow the rotary unit 24 to move in a linear motion relative to the housing 12, but also prevent idling of the motor 28.

The linear actuator 10 of the present disclosure has the advantages of improved precision and stiffness. Because the screw member 13 is directly connected to the motor shaft 123 of the motor 28, the displacement of the screw member 13 depends largely on the threads of the screw member 13 and the rotating speeds of the motor shaft 123, as opposed to prior art where the displacement is likely to be adversely affected by the manufacturing and assembly tolerance of various components that couple the motor shaft to the screw member. By properly controlling the rotating speeds of the motor 28, the displacement of the screw member 13 can be more precisely controlled to a nanometer scale.

Moreover, the screw member 13 has one end directly connected to the motor shaft 123 and a portion adjacent to the other end sufficiently supported on the narrowed portion 16 of the housing 12. The gap between the lugs 46 of the sliding bracket 26 and the groove surfaces 34 of the guiding grooves 30 are filled by the damping materials 42. Therefore, vibration is reduced and the stiffness of the linear actuator 10 is improved.

Figure 4:
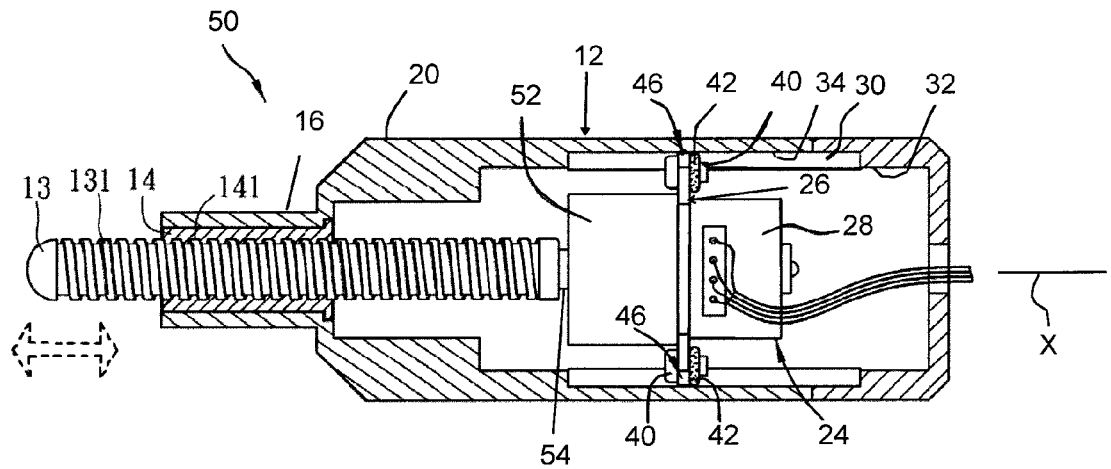
FIG. 4 is a cross-sectional view of a linear actuator according to a second embodiment of the present disclosure.

Referring to FIG. 4, a linear actuator 50 in the second embodiment is similar to the linear actuator 10 of the first embodiment except that the linear actuator 50 includes a variable speed unit 52. In the following, like components are designated by like reference characters/numbers and the description thereof is omitted herein.

The variable speed unit 52, which is part of the rotary unit 26, is disposed between the motor 28 and the screw member 13 to change the output speed of the motor 28. The variable speed unit 52 may be a reduction gear unit and may have an input shaft (not shown) connected to the motor shaft and an output shaft 54 directly secured to the screw member 13. Therefore, the output speed can be easily controlled and adjusted depending on the amount of displacement required for the screw member 13.

Figure 5:
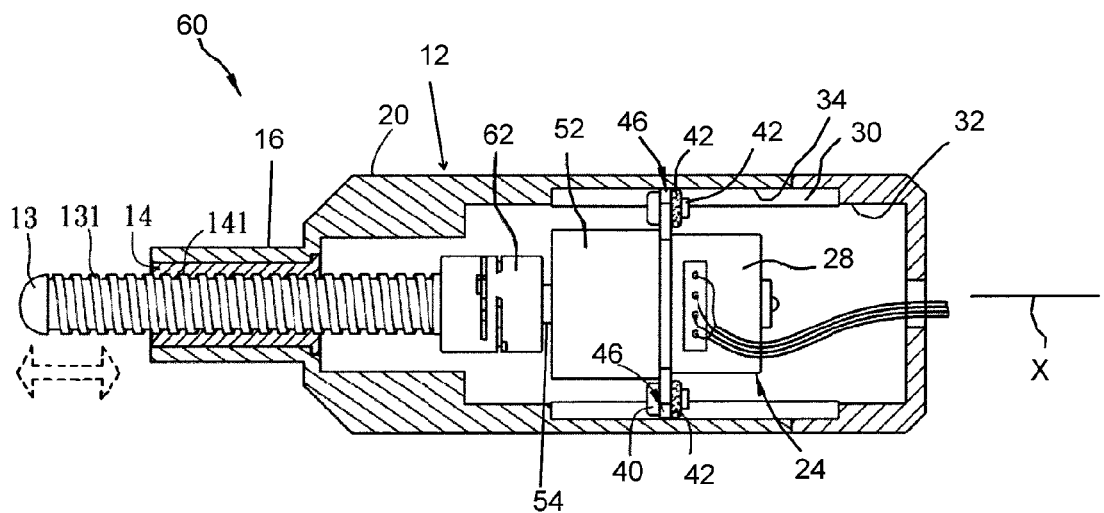
FIG. 5 is a cross-sectional view of a linear actuator according to a third embodiment of the present disclosure.

Referring to FIG. 5, a linear actuator 60 in the third embodiment is similar to the linear actuator 50 of the second embodiment except that the linear actuator 60 includes a coupling device 62. The coupling device 62 connects the output shaft 54 of the variable speed unit 52 to the screw member 13. The screw member 13 is driven by the rotary unit 24 through the coupling member 62.

The coupling member 62 may be a flexible coupling, which can reduce impact, compensate for alignment errors between the screw member 13 and the motor 28, both in axial and radial directions. The coupling member 62 may be of a relatively small length, compared with conventional linear actuators where a sliding coupling for coupling the screw member 13 and the motor shaft 123 generally requires a relatively long length to provide sufficient longitudinal space for the screw member to move therein. Therefore, the stiffness of linear actuator 60 of the present embodiment can be further improved.

It is understood that in another variant of the linear actuator, the variable speed unit may be eliminated and the coupling device 62 may be provided to couple the motor shaft 123 to the screw member 13.

Figure 6:
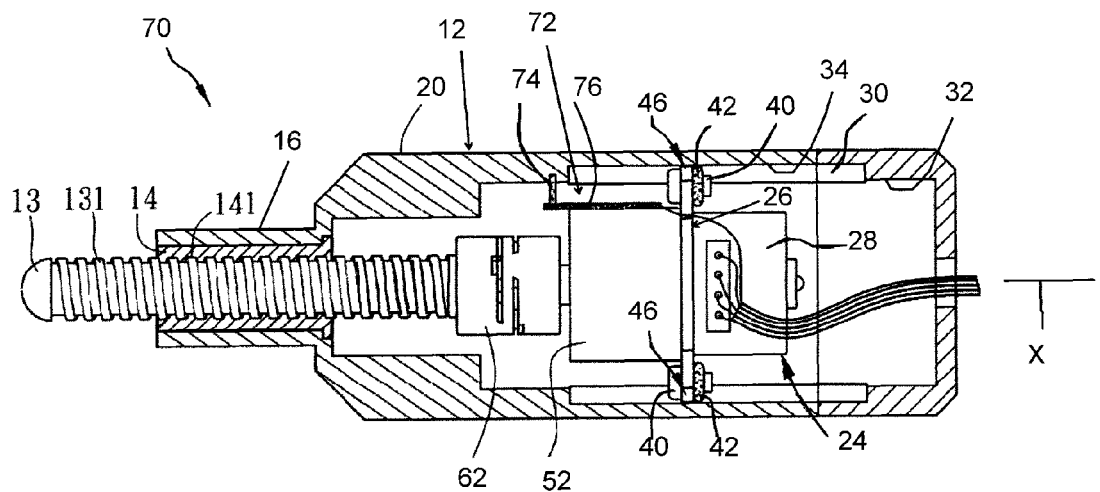
FIG. 6 is a cross-sectional view of a linear actuator according to a fourth embodiment of the present disclosure.

Referring to FIGS. 6, a linear actuator 70 of the fourth embodiment is similar to that of the third embodiment except that the linear actuator 70 includes a sensor 72 disposed inside the housing 12 for detecting the position of the screw member 13. In the present embodiment, the sensor 18 includes a fixed element 74 and a movable element 76, which are conductors. The fixed element 74 is attached to the housing 12. The movable element 76 is attached to the variable speed unit 52, which is a part of the rotary unit 24. The fixed elements 74 and 76 form parts of an electric circuit. When the rotary unit 24 is in a first position, the fixed element 74 contacts a first point of the movable element 76 and thus the electric circuit has a first resistance. When the screw member 13 is driven by the rotary unit 24, the rotary unit 24 also moves with the screw member 13 and slides along the guiding grooves 30 to a second position. The fixed element 74 contacts a second point of the movable element 76 and thus the electric circuit has a second resistance. The displacement of the screw member 13 can be determined based on the difference between the first and second resistance.

Figure 7:
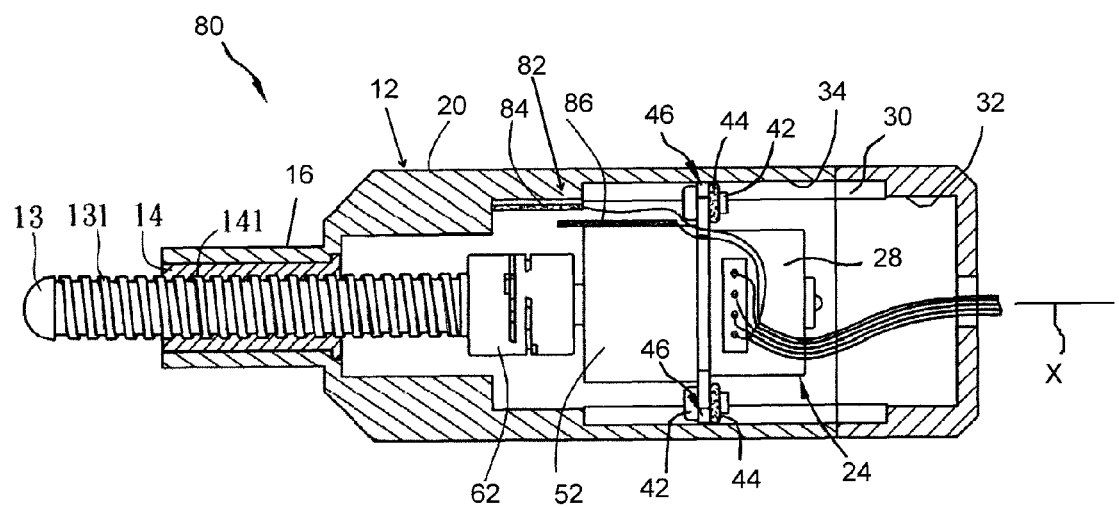
FIG. 7 is a cross-sectional view of a linear actuator according to a fifth embodiment of the present disclosure.

Referring to FIG. 7, a linear actuator 80 of the fifth embodiment is similar to that of FIG. 6 except that the linear actuator 80 has a sensor 82 that uses capacitance to detect the position of the screw member 13. The sensor 82 has a fixed element 84 and a movable element 86 spaced part and in the form of metal plates. The fixed and movable elements 84 and 86 are disposed at the housing 12 and the rotary unit 24, respectively. The overlapping area between the fixed and movable elements 84 and 86 changes as the screw member 13 and the rotary unit 24 move. The capacitance value depends on the overlapping area between the fixed and movable elements 84 and 86. The displacement of the screw member 13 can be determined by determining the change in capacitance. The precision positioning of the linear actuator 80 can be improved by using the sensor 82 and the motor to provide a closed-loop feed-back control.

While not shown in the drawings, it is understood the sensors 72 and 82 can be properly configured to use resistance, capacitance, and inductance to measure the displacement of the rotary unit 24 and consequently the displacement of the screw member 13. Any position sensor known in the art that can be used to detect position of the rotary unit 24 can be used without departing from the scope of the present disclosure.

According to the present disclosure, the linear actuators can be precisely positioned by using sensors and a closed loop system. Therefore, the displacement of the screw member 13 can be properly monitored for precision positioning.

Figure 8:
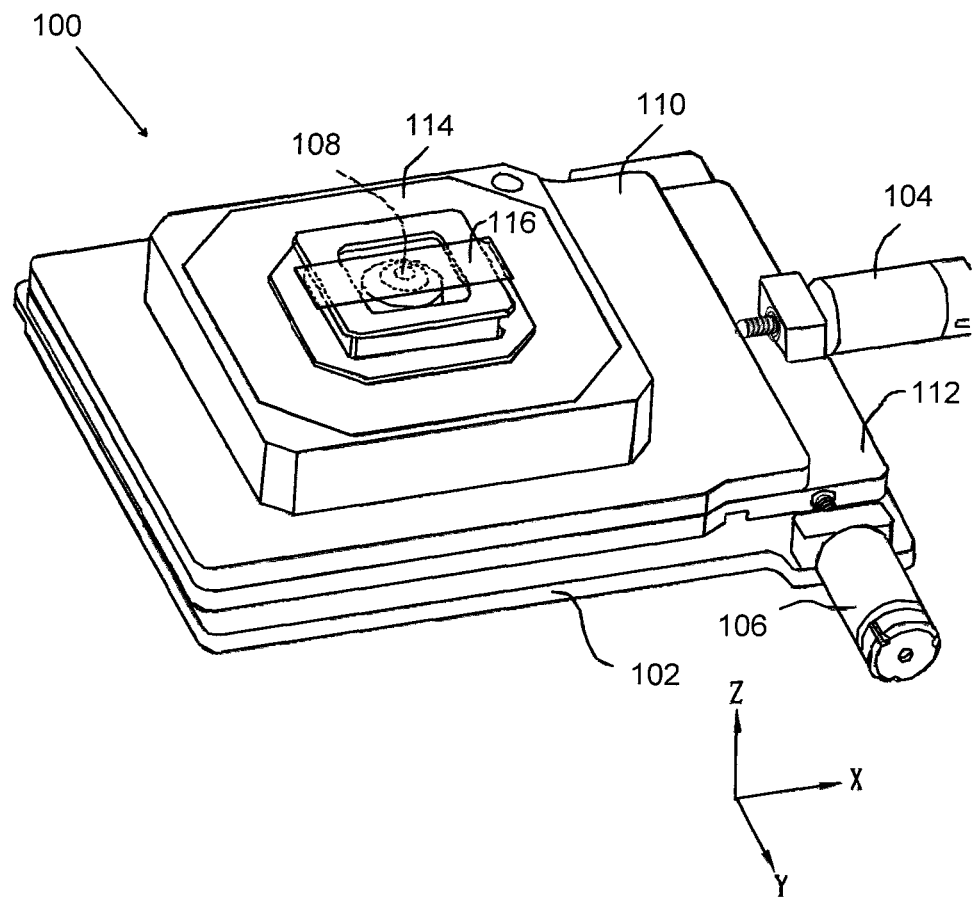
FIG. 8 is a perspective view of a linear actuating module that is shown to have three linear actuators for 3-dimentional linear movements according to the present disclosure.

Referring to FIG. 8, a linear actuating module 100 of a sixth embodiment includes a support stage 102, a first linear actuator 104, a second linear actuator 106 and a third linear actuator 108 for providing linear movement in X, Y, and Z directions, respectively. A first movable block 110, a second movable block 112, and a third movable block 114 are slidably supported on the support stage 102 and can be moved by the first, second and third linear actuators 104, 106 and 108 in the X, Y, and Z directions, respectively. The first, second and third actuators 104, 106 and 108 can be any of the linear actuators 10, 40, 50, 60, 70 and 80 shown in FIGS. 1-7. Therefore, the description of the first, second and third actuators 104, 106 and 108 are omitted herein.

The third movable block 114 includes a sample stage 116 on which a sample (not shown) is placed thereon. When the first linear actuator 104 moves the first movable block 110, the sample stage 114 of the third movable block 114 is also moved with the first movable block 110 in the X direction. When the second linear actuator 106 moves the second movable block 112, the third movable block 114 (including the sample stage 116) and the first movable block 110 which are disposed on the second movable block 112 are also moved in the Y direction. The third linear actuator 108 is disposed right below the sample stage 114 and can directly move the third movable block 114 including the sample stage 114. The first, second, and third linear actuators 104, 106, and 108 provide linear movements that are precisely controlled by the motor speed. Therefore, the sample stage 114 can be properly positioned in a nanometer scale.

According to the present disclosure, the linear actuators 10, 50, 60, 70, 80 are of a coupling type and thus have three degrees of freedom of resonance. The resonant frequency of the linear actuators 10, 50, 60, 70, 80 in three-degrees of freedom, according to experiments by inventors, are 2.6 kHz, 4 kHz and 7.6 kHz, which are higher than the resonant frequency of 1.7 KHZ of a typical linear actuator. Therefore, the linear actuators of the present disclosure have higher stiffness due to the higher resonant frequency.

The linear actuators and the linear actuating module using the linear actuators according to the present disclosure have fewer components than the typical linear actuators and with less clearance among components. Therefore, the linear actuators and the linear actuating module can be manufactured with lower costs and with improved stiffness.

The linear actuators 10, 50, 60, 70, 80 and the linear actuating module 100 can be used in, for example, atomic force microscope (AFM) for actuating the sample stage or scanning probe, sample stage of optical microscope, elements of optical system, topography measurement instruments. The linear actuators can find applications in any areas for nano-positioning without departing from the scope of the present disclosure.

For example, the linear actuators 10, 50, 60, 70, and 80 may be used as a light blocker in an optical system. A light-blocking element may be disposed on the screw member 13 at a portion protruding from the housing 10. When the screw member 13 moves, the light-blocking element on the screw member 13 is moved to become aligned with the light from an external light source, such as laser or X-ray, thereby blocking the light from the light source. As such, the linear actuator can be used as a light blocker in an optical system.

The broad teachings of the disclosure can be implemented in a variety of forms. Therefore, while this disclosure includes particular examples, the true scope of the disclosure should not be so limited since modifications will become apparent from the following claims.

What is claimed is:

1. A linear actuator, comprising:
    a housing;
    a rotary unit disposed in the housing, the rotary unit including a support portion in sliding contact with the housing and a driving shaft; and
    a screw member attached to the driving shaft of the rotary unit, and including a threaded portion engaging a threaded portion of the housing,
    wherein when the driving shaft of the rotary unit rotates, the screw member is driven to rotate, causing the screw member to be translatable relative to the housing due to engagement between the threaded portion of the screw member and the threaded portion of the housing.

2. The linear actuator of claim 1, wherein the support portion of the rotary unit is in slidable contact with an inner surface of the housing.

3. The linear actuator of claim 2, wherein the support portion of the rotary unit is a sliding bracket, the rotary unit further comprising a motor attached to the sliding bracket.

4. The linear actuator of claim 3, wherein the sliding bracket has lugs extending into guiding grooves on the housing.

5. The linear actuator of Claim 4, wherein the lugs are in sliding contact with the housing.

6. The linear actuator of claim 4, wherein the sliding bracket includes damping materials to fill a gap between the lugs and the housing.

7. The linear actuator of claim 1, wherein the rotary unit and the screw member move as a unit in a linear direction.

8. The linear actuator of claim 1, wherein the rotary unit further includes a variable speed unit.

9. The linear actuator of claim 1, further comprising a coupling member for coupling the rotary unit to the screw member.

10. The linear actuator of claim 1, wherein the housing includes an enlarged portion and a narrowed portion, wherein a portion of the screw member is supported on the narrowed portion.

11. The linear actuator of claim 10, further comprising a guiding member disposed in the narrowed portion, the guiding member having internal threads engaging external threads of the screw member.

12. The linear actuator of claim 1, further comprising a sensor disposed inside the housing for measuring a displacement of the rotary unit.

13. The linear actuate module of claim 12, wherein the sensor includes a fixed element mounted on the housing and a movable element mounted on the rotary unit.

14. The linear actuator of claim 13, wherein the sensor measure the displacement of the rotary unit based on resistance, capacitance, inductance of the fixed element and the movable element.

15. A linear actuator, comprising:
    a housing;
    a sliding bracket disposed in the housing and slidable in a pair of guiding grooves formed on an inner surface of the housing;
    a motor attached to the sliding bracket and including a motor shaft;
    a lead screw attached to the motor shaft such that the motor moves together with the lead screw,
    wherein when the motor provides a rotary motion to the lead screw, the lead screw displaces due to a threaded-connection between the lead screw and an adjacent component, the displacement of the lead screw causes the motor to move together with the lead screw relative to the housing along a longitudinal direction of the housing.

16. A linear actuating module, comprising:
a sample stage for supporting a sample;
a first linear actuator for providing a linear movement to the sample stage along an X axis;
a second linear actuator for providing a linear movement to the sample stage along an Y axis;
a third linear actuator for providing a linear movement to the sample stage along a Z axis,
wherein the first, second, and third linear actuators each include:
a housing, a screw member, a rotary unit including a support portion in sliding contact with the housing and a driving shaft for providing rotary motion to the screw member, wherein the screw member is attached to the driving shaft of the rotary unit and includes a threaded portion engaging a threaded portion of the housing, and wherein when the driving shaft of the rotatory unit rotates, the screw member is driven to rotate, causing the screw member to be translatable relative to the housing due to engagement between the threaded portion of the screw member and the threaded portion of the housing.

17. The linear actuating module of claim 16, wherein the first, second, and third linear actuators each include a motor, wherein the support portion is a sliding bracket and the motor is attached to the sliding bracket.

18. The linear actuating module of claim 17, wherein the sliding brackets are slidable inside the housing.

19. The linear actuating module of claim 18, further comprising damping materials that fill gaps between the sliding brackets and the housing.

* * * * *